United States Patent [19]
Oyaizu

[11] Patent Number: 5,961,102
[45] Date of Patent: Oct. 5, 1999

[54] GAS SPRING

[75] Inventor: Hiroshi Oyaizu, Shizuoka, Japan

[73] Assignee: Showa Corproration, Minato-ku, Japan

[21] Appl. No.: 09/003,926

[22] Filed: Jan. 7, 1998

[30] Foreign Application Priority Data

Jan. 7, 1997 [JP] Japan ................................. 9-011927
Jun. 4, 1997 [JP] Japan ................................. 9-160686

[51] Int. Cl.$^6$ ................................ F16F 9/32; F16F 9/02; B60J 5/10
[52] U.S. Cl. .......................................... 267/120; 188/300
[58] Field of Search ............................... 267/64.12, 120; 188/322.16, 322.17, 300

[56] References Cited

U.S. PATENT DOCUMENTS

| | | | |
|---|---|---|---|
| 4,595,182 | 6/1986 | Freitag et al. | 267/120 |
| 5,702,091 | 12/1997 | Perrin et al. | 267/120 |
| 5,797,593 | 8/1998 | Oyaizu | 267/64.12 |

FOREIGN PATENT DOCUMENTS

| | | |
|---|---|---|
| 0768476 | 4/1997 | European Pat. Off. . |
| 1124206 | 10/1956 | France . |
| 2305645 | 10/1976 | France . |
| 0969377 | 5/1958 | Germany . |
| 29521309 | 12/1996 | Germany . |
| 63-80346 | 5/1985 | Japan . |
| 63-80346 | 5/1988 | Japan . |

*Primary Examiner*—Chris Schwartz
*Attorney, Agent, or Firm*—Dvorak & Orum

[57] ABSTRACT

A gas spring 20 having a piston 23 slidably disposed within a cylinder 21 sealed with air 25, with one end of the cylinder closed, having a rod 22 fixed to the piston 23, having cylinder grooves 29 extending in an axial direction of the cylinder formed on the inner periphery of the cylinder so that an extension side damping force is generated in an extension process in the cylinder grooves, and having one end of the cylinder and the rod fitted to a vehicle body with the other end fitted to a rear door pivoted on the body, wherein the cylinder grooves are formed in both-side movable areas X and Z excluding a locking area Y in a stroke area of the piston.

9 Claims, 5 Drawing Sheets

GAS SPRING

BACKGROUND OF THE INVENTION

1. Field of the Invention

This invention relates to a gas spring to be used for opening and closing of a rear door of a four-wheel drive or vehicle, which includes vans, station wagons and other type of vehicles.

2. Description of Related Art

In the vehicle, generally there is provided a rear door (an opening and closing member) which is pivoted around a horizontal axis or a perpendicular axis next to vehicle body (main body), with a gas spring provided between the rear door and the body so that the force required for opening the rear door is reduced by a repulsive force (assisting force) of the gas spring.

Among such types of gas springs, there is one, as disclosed by the Japanese Utility Model Application Laid-open Publication No. 63-80346, where the rear door is connected to the body pivotally around a horizontal axis, and a guide pin is provided in a cylinder of the gas spring, and a guide cylinder is extended to cover the cylinder from the both-sides and is disposed in a rod, a guide groove is extended in a direction of extension and compression stroke of the gas spring and is formed in the guide cylinder, and the guide pin is engaged with an engagement stage of the guide groove, to thereby restrict the extension stroke of the gas spring so as to adjust the extent of opening of the rear door in two stages.

According to the gas spring described in the above publication, however, it is necessary to provide the guide pin and the guide cylinder, which results in an increase in the number of parts and an increase in the number of assembly process as well as the cost to manufacture.

SUMMARY OF THE INVENTION

The present invention is provided overcomes the disadvantages of the above structure, and it is an object of the present invention to provide a gas spring which enables an adjustment of the extent of opening of the opening and closing member in a plurality of stages without incurring an increase in the number of assembly steps and production cost increase.

According to the present invention, a piston is slidably disposed within a cylinder in which a gas is sealed with one end of the cylinder closed. A rod fixed to the piston projects from an open end of the cylinder. Repulsive force means for generating a repulsive force for biasing the rod to the extension direction is provided within the cylinder. Cylinder grooves extending in an axial direction of the cylinder are formed on the inner periphery of the cylinder. An extension side damping force is generated in the extension process in the cylinder grooves, and one of the cylinder and the rod is fitted to a main body with the other fitted to an opening and closing member pivotally provided in the main body. The cylinder grooves are formed in both-side areas excluding a predetermined area in the stroke direction of the piston.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENTS (A) A first embodiment

Embodiment of implementation of the present invention will be explained below with reference to the drawings.

Figure 1:
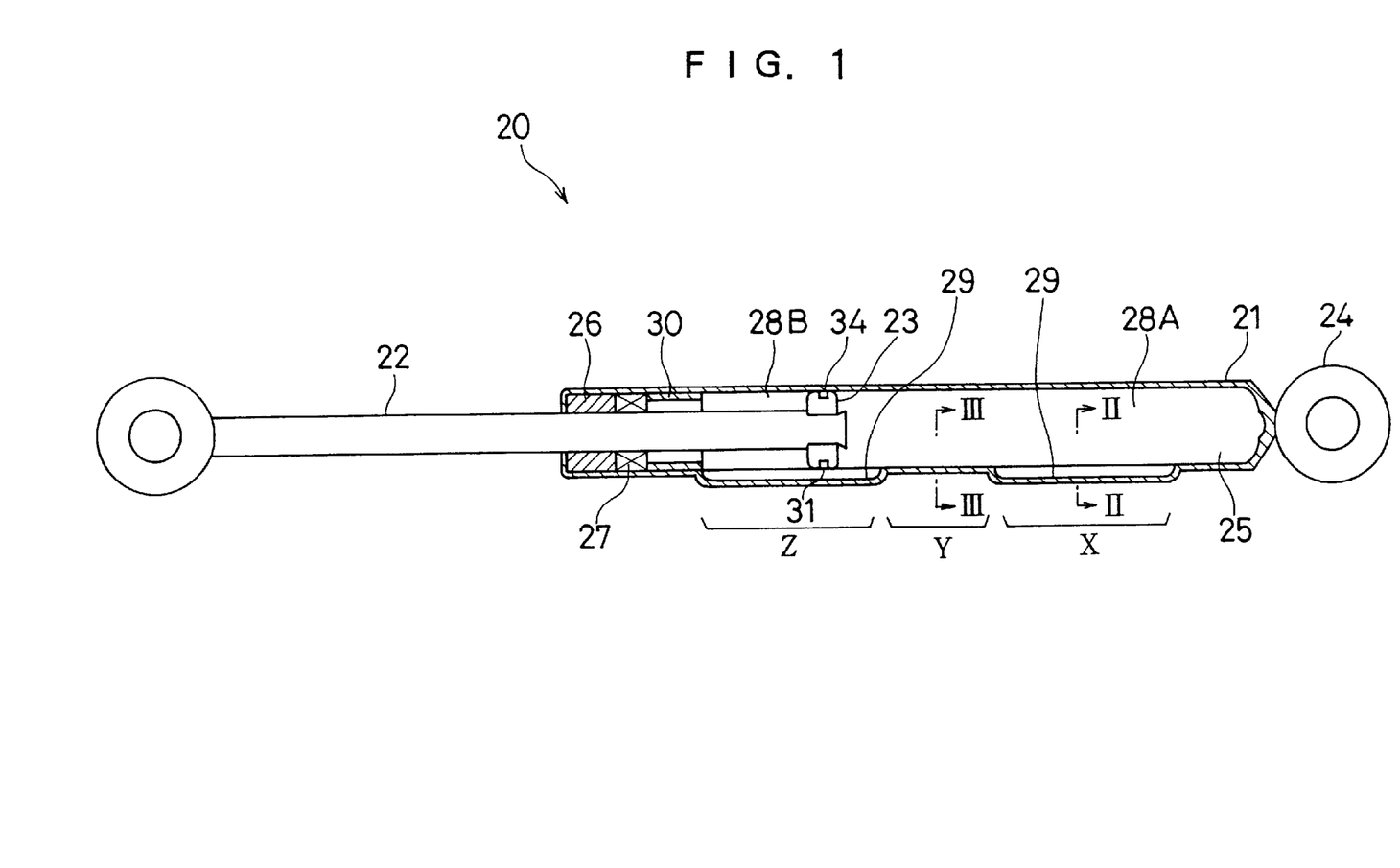
FIG. 1 is a side cross sectional view showing a first embodiment of a gas spring relating to the present invention.
Figure 2:
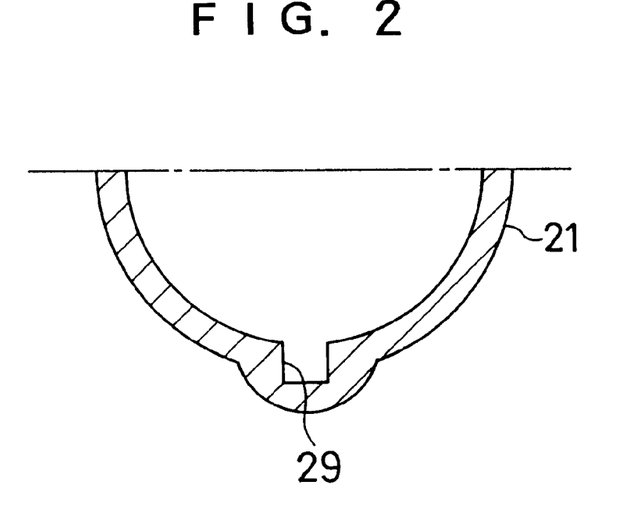
FIG. 2 is a half cross sectional view along a II—II line in FIG. 1.
Figure 3:
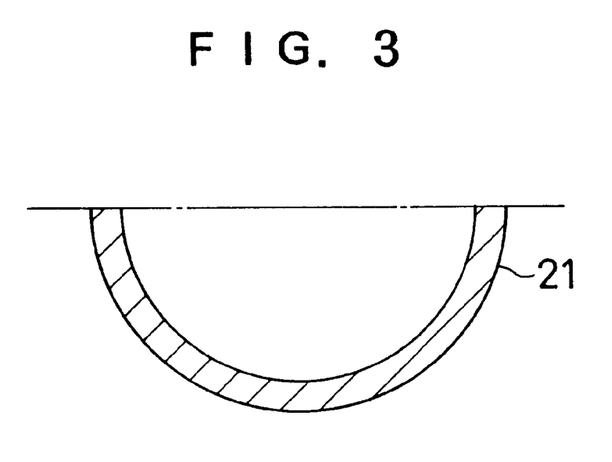
FIG. 3 is a cross sectional view along a III—III line in FIG. 1.
Figure 4:
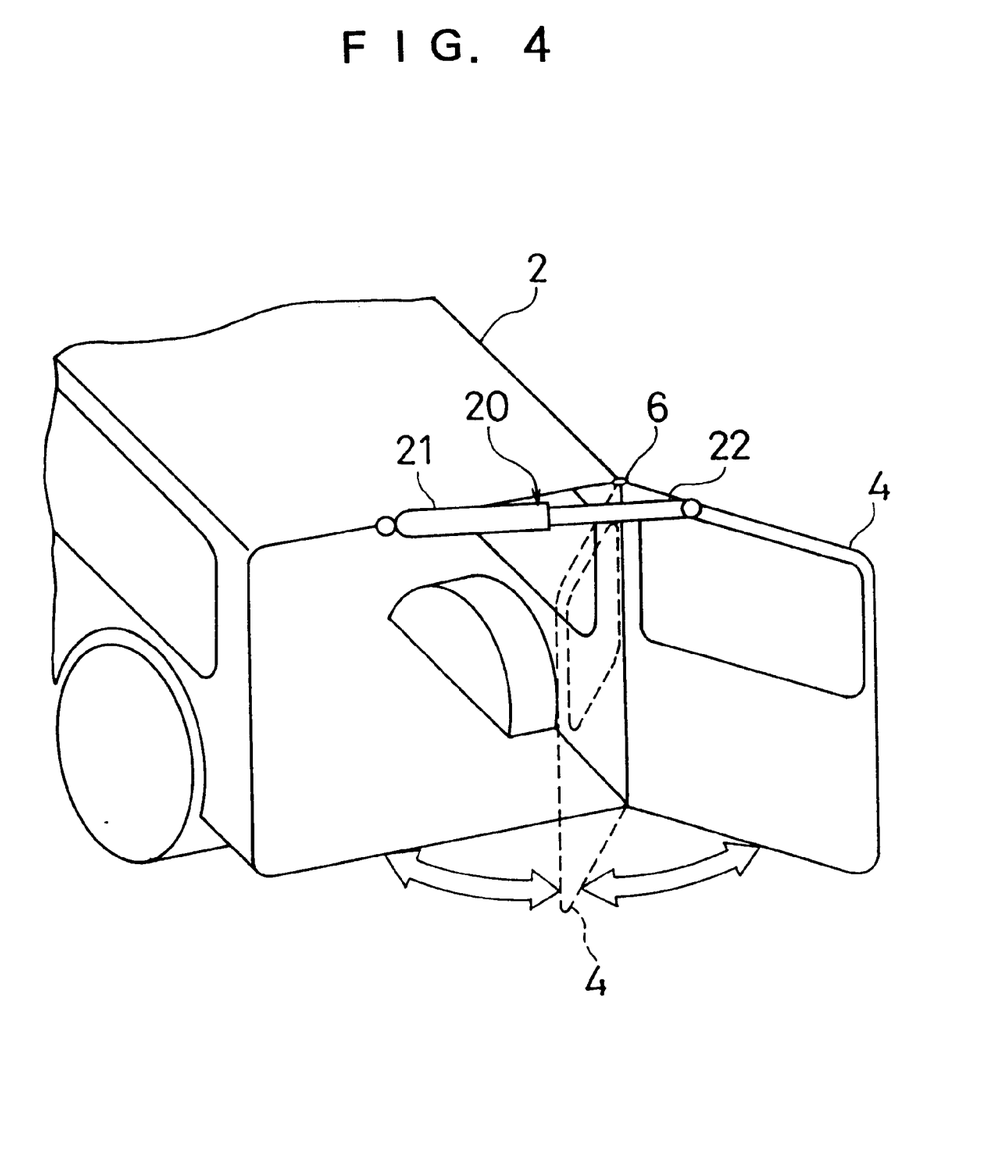
FIG. 4 is a side view showing the surrounding of a rear door of a vehicle with the gas spring shown in FIG. 1.

FIG. 1 is a side cross sectional view showing a first embodiment of a gas spring relating to the present invention. FIG. 2 is a cross sectional view along a II—II line in FIG. 1. FIG. 3 is a cross sectional view along a III—III line in FIG. 1. FIG. 4 is a side view showing the surrounding of a rear door of a vehicle with the gas spring shown in FIG. 1.

A gas spring 20 shown in FIG. 1 is used on a vehicle, and is used particularly as a gas spring of laternal open-door type. This gas spring 20 has a piston 23 fastened to one end of a rod 22 and slidably disposed within a cylinder 21 with one end of the cylinder 21 closed. A bracket 24 of the cylinder 21 is fitted to a vehicle body 2 as a main body and the other end of the rod 22 is fitted to a rear door 4 of the vehicle as an opening and closing member, as shown in FIG. 4. The rear door 4 is attached to the body 2 pivotally around a vartical axis 6.

As shown in FIG. 1, air 25 (or a nitrogen gas or the like) as gas is sealed in the cylinder 21, and a rod guide 26 and a gas seal 27 are disposed at an open end of the cylinder 21. Movement of the rod 22 along with the above-described sliding of the piston 23 is guided by the rod guide 26, and leakage of air 25 is prevented by the gas seal 27. A fine volume of oil sufficient to maintain a satisfactory sealing and lubrication of the gas seal 27 is sealed within the cylinder 21.

The inside of the cylinder 21 is divided by the piston 23 into a rod-side chamber 28B in which the rod 22 is accommodated and a piston-side chamber 28A in which the rod 22 is not accommodated. Air 25 is sealed in both chambers 28A and 28B. The pressure of air 25 (air repulsive force) is the same in both the piston-side chamber 28A and the rod-side chamber 28B. However, since the area which receives the pressure of the piston 27 in the piston-side chamber 28A is larger than the area which receives the pressure of the piston in the rod-side chamber 28B by the amount of cross sectional area of the rod 22, the air repulsive force within the piston-side chamber 28A works as a bias force (assist force) for biasing the rod 22 and the piston 23 in the direction of an extension of the gas spring 20 in an extension process of the gas spring 20, so that the air 25 functions as repulsive force means.

On the inner periphery of the cylinder 21, cylinder grooves 29 are formed as shown in FIGS. 1 and 2. These cylinder grooves 29 are formed by expanding the inner periphery of the cylinder 21 outwardy in a plastic processing such as roll forming or the like. A collar 30 is disposed near the position where the rod guide 26 and the gas seal 27 are disposed in the cylinder 21. The piston 23 is brought into contact with the collar 30 and a further move of the piston 23 in the extension direction is restricted, so that the position at which the piston 23 is brought into contact with the collar 30 is the maximum extension end of the piston 23.

In the above-described piston 23, a ring-shaped groove 31 is formed in the outer periphery, and the O-ring 34 is engaged in this ring-shaped groove 31 as an elastic sealing member. The O-ring 34 is closely adhered to the inner peripheral surface of the cylinder 21. The piston 23 is a structure without a passage such as an orifice for communicating between the piston-side chamber 28A and the rod-side chamber 28B.

The rear door 4 is opened and closed in the range from a fully closed position to a fully opened position as indicated by a solid line, as shown in FIG. 4. In this case, the piston 23 of the gas spring 20 moves in the range of almost one full stroke area of the cylinder 21. The opening operation of the rear door 4 is carried out by an extension of the gas spring 20 caused by a repulsive force of air 25 within the piston-side chamber 28A. In this case, air 25 within the rod-side chamber 28B shown in FIG. 1 flows to the piston-side chamber 28A through the cylinder groove 29, so that an extension-side damping force is generated by a resistance of the flow.

The cylinder grooves 29 are formed to extend in an axial direction of the cylinder 21 on the inner periphery of the cylinder 21 in both-side movable areas X and Z excluding a locking area Y of the stroke area of the piston 23, as shown in FIGS. 1 to 3. In other words, the cylinder groove 29 is not formed in the locking area Y of the cylinder 21, as shown in FIG. 3. In the areas X and Z, the cylinder groove 29 has a square cross-sectional shape, with almost a constant cross section.

When the piston 23 is located in the movable areas X and Z, air 25 flows through the cylinder grooves 29. In the extension process of the gas spring 20, an extension-side damping force is generated by the flow resistance caused by the flow of air 25 within the rod-side chamber 28B through the cylinder groove 29, and the moving speed of the piston 23 and the rod 22 in the extension direction is controlled by this extension-side damping force, with the result that the opening speed of the rear door 4 is appropriate.

Figure 6:
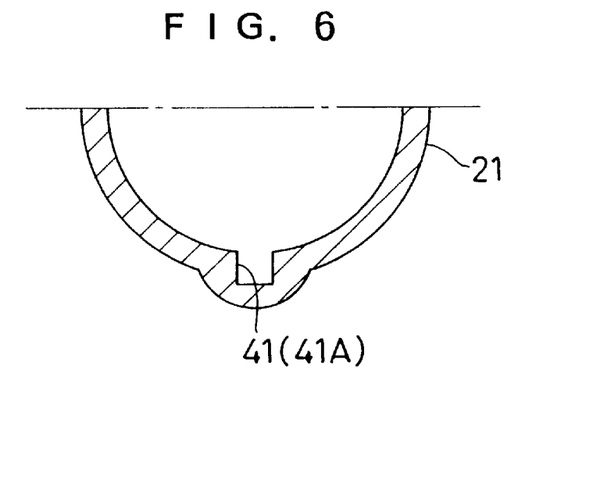
FIG. 6 is a cross sectional view along a VI—VI line in FIG. 5.

When the piston 23 has reached the locking area Y in the extension process or the compression process of the gas spring 20, air 25 does not flow from the rod-side chamber 28B to the piston-side chamber 28A between the O-ring 34 mounted on the piston 23 and the cylinder 21 because the cylinder groove 29 is not present at that point in the cylinder 21. Therefore, the piston 23 and the rod 22 stop in this locking area Y, so that the rear door 4 stops at a position indicated by a two-dot chain line as shown in FIG. 6.

The operation will be explained next.

In the extension process of gas spring 20, the repulsive force of air 25 within the piston-side chamber 28A shown in FIG. 1 works to the piston 23 and the rod 22, so that the piston 23 and the rod 22 move in the extension direction.

When the piston 23 is in the movable area X in the extension process of the gas spring 20, air 25 within the rod-side chamber 28B flows through the cylinder groove 29 into the piston-side chamber 28A, and a extension-side damping force is generated by the flow resistance caused by the flow of air 25 through the cylinder groove 29. By this extension-side damping force, the moving speed of the piston 23 and the rod 22 for moving in the extension direction by the repulsive force of air 25 within the piston-side chamber 28A is controlled to a proper level. Accordingly, the rear door 4 is opened at a proper speed from the fully closed position as shown in FIG. 4.

When the piston 23 has reached the locking area Y in the extension process of the gas spring 20 shown in FIG. 1, air 25 does not flow from the rod-side chamber 28B to the piston-side chamber 28A between the O-ring 34 mounted on the piston 23 and the inner peripheral surface of the cylinder 21 because the cylinder groove 29 is absent in the locking area Y. Therefore, the piston 23 and the rod 22 stop in this locking area Y, so that the rear door 4 in the opening process stops at a half-opened position (indicated by the broken line) as shown in FIG. 4. As a result, it is possible to prevent an unintentional opening of the rear door 4 by an angle more than a required angle of 90 degrees.

When the rear door 4 is pushed, manually for example, from the half-opened position to make the piston 23 reach the movable position Z of the cylinder 21 shown in FIG. 1, air 25 within the rod-side chamber 28B flows through the cylinder groove 29 into the piston-side chamber 28A because the cylinder groove 29 is formed in the movable area Z. By the flow resistance of air 25 flowing through the cylinder groove 29, the piston 23 and the rod 22 move again in the extension direction at a proper speed similar to the speed in the movable area X, by the repulsive force of air 25 within the piston-side chamber 28A. Then, the piston 23 is brought into contact with the collar 30 and stops there. Accordingly, the rear door 4 is opened at a proper opening speed from the half-opened position (indicated by the broken line) to the fully opened position (indicated by the solid line) as shown in FIG. 4.

In the compression process of the gas spring 20, since the cylinder groove 29 is formed in the movable area Z of the cylinder 21, as shown in FIG. 1, when the rear door 4 is closed from the fully opened position (indicated by the solid line) in FIG. 4 by hand or by the self-weight of the rear door 4 at the time when the vehicle is parked on a sloped surface air 25 within the piston-side chamber 28A flows through the cylinder groove 29 and reaches the rod-side chamber 28B, so that the piston 23 and the rod 22 move in the compression direction against the repulsive force of air 25 within the piston-side chamber 28A.

When the piston 23 and the rod 22 reach the locking area Y of the cylinder 21, air 25 stops flowing from the rod-side chamber 28B to the piston-side chamber 28A between the O-ring 34 of the piston 23 and the cylinder 21 because the cylinder groove 29 is not formed in this locking area Y. Thus, the piston 23 and the rod 22 stop in the locking area Y. Accordingly, the rear door 4 stops at the half-opened position (indicated by the broken line in FIG. 4) corresponding to the locking area Y of the cylinder 21 even if the rear door 4 is closed by the weight of the door when the vehicle is parking on a sloped surface, for example.

When the rear door 4 is opened by hand, for example, from the above-described half-opened position, the piston 23 and the rod 22 of the gas spring 20 reach the movable area X of the cylinder 21, and air 25 within the piston-side chamber 28A flows through the cylinder groove 29 and reaches the rod-side chamber 28B. Therefore, the rear door 4 moves in the compression direction by hand or by the self-weight against the repulsive force of the air 25 within the piston-side chamber 28A, and then the rear door 4 is fully closed.

According to the gas spring 20 of the above-described embodiment, the following benefits (1) and (2) are obtained.

(1) Since the cylinder grooves 29 are formed in both-side movable areas X and Z excluding the locking area Y in the stroke area of the piston 23 of the cylinder 21, air 25 stops flowing from the rod-side chamber 28B to the piston-side chamber 28A between the O-ring 34 of the piston 23 and the cylinder 21 (in the extension process) and air 25 stops flowing from the piston-side chamber 28A to the rod-side chamber 28B (in the compression process) when the piston 23 has reached the locking area Y, both in the extension process in which the piston 23 and the rod 22 move in the extension direction of the gas spring 20 by the action of the repulsive force of air 25 within the piston-side chamber 28A and in the compression process in which the piston 23 and the rod 22 move in the compression direction of the gas spring 20 against the repulsive force. Accordingly, the movement of the piston 23 and the rod 22 in the extension direction or in the compression direction stops. As explained above, since the rear door 4 can be stopped once in the middle of the opening or closing operation by stopping the movement of the piston 23 and the rod 22 in the extension direction or compression direction in the stroke area of the piston 23, the extent of opening of the rear door 4 to be opened or closed in the piston stroke area of the gas spring 20 can be adjusted in two stages. As a result, particularly when the opening and closing member is the lateral opening rear door 4 of the vehicle, it is possible to prevent trouble in traffic due to an unprepared opening of the rear door 4 by an angle more than a required angle of 90 degrees and it is also possible to prevent an unprepared closing of the rear door 4 when the vehicle is parked on a sloped surface.

(2) Further, according to the gas spring structure described, since the extent of opening of the rear door 4 can be adjusted as explained in (1) above by providing the locking area Y having no cylinder groove 29 formed in the cylinder 21, it is possible to minimize the number of parts of the structure and it is also possible to reduce the number of assembly parts of the gas spring 20 and to reduce the cost of manufacture.

(B) A second embodiment

Figure 5:
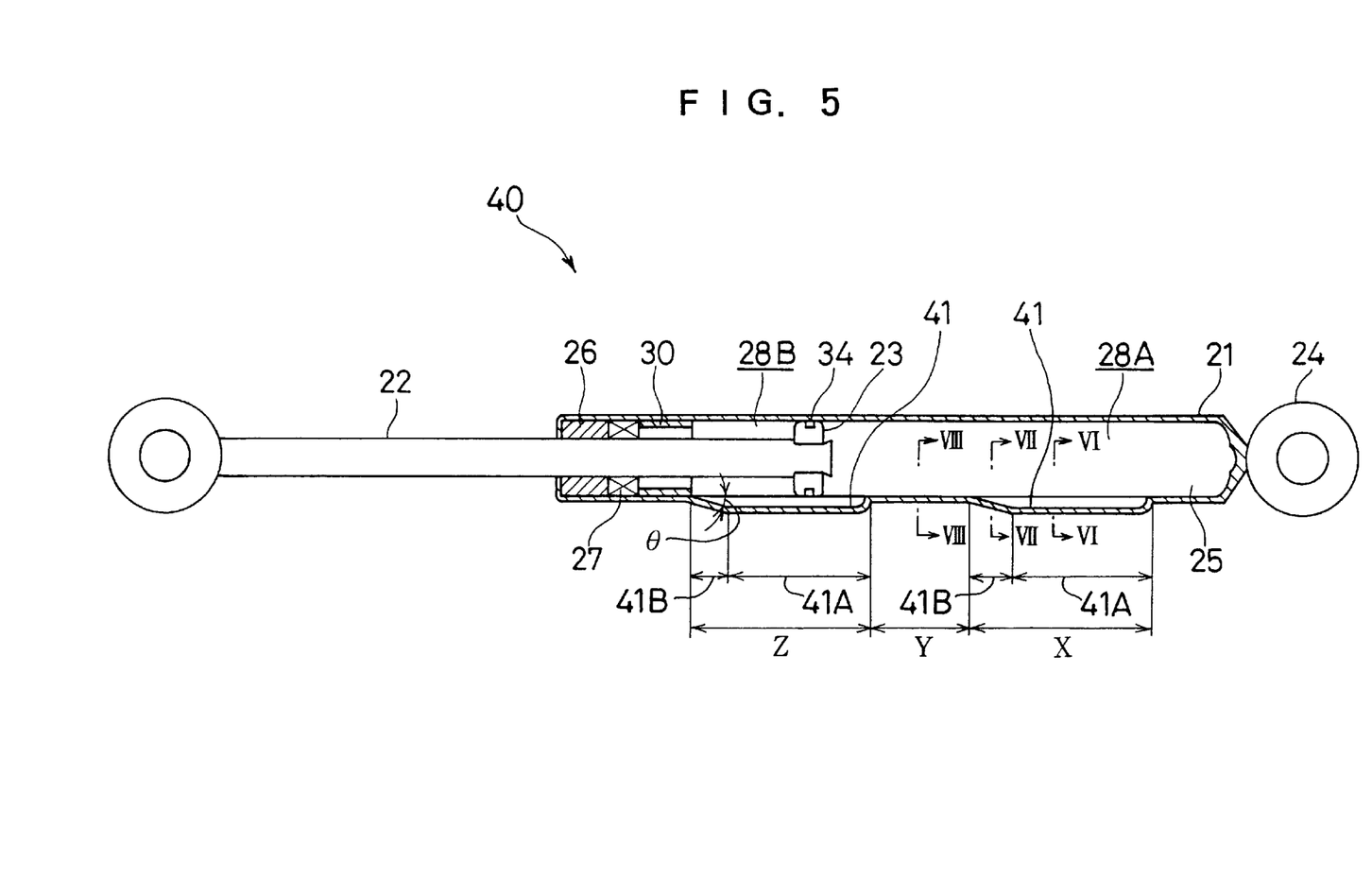
FIG. 5 is a side cross sectional view showing a second embodiment of the gas spring relating to the present invention.
Figure 7:
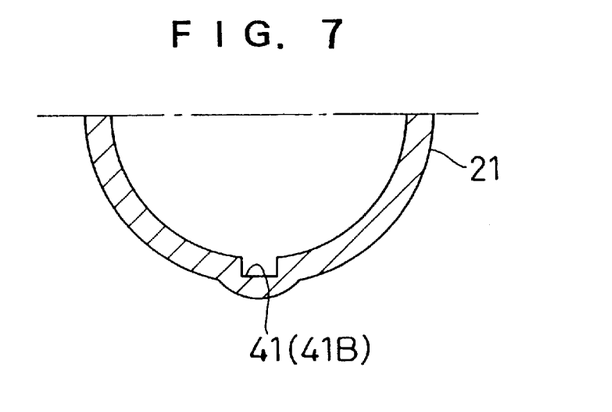
FIG. 7 is a cross sectional view along a VII—VII line in FIG. 5.
Figure 8:
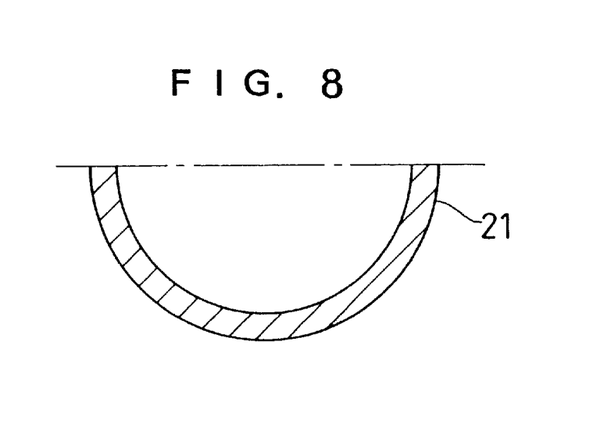
FIG. 8 is a cross sectional view along a VIII—VIII line in FIG. 5.

FIG. 5 is a side cross sectional view showing a second embodiment of the gas spring of the present invention. FIG. 6 is a cross sectional view along a VI—VI line in FIG. 5. FIG. 7 is a cross sectional diagram cut along a VII—VII line in FIG. 5. FIG. 8 is a cross sectional view along a VIII—VIII line in FIG. 5. In this second embodiment, portions similar to those in the first embodiment are identified by the same reference numbers and their explanation will be omitted.

As shown in FIG. 5, in a gas spring 40, cylinder grooves 41 formed in the movable areas X and Z of the cylinder 21 are of the same shape. Each of the cylinder grooves 41 is structured by a straight section 41A having a constant groove cross sectional area and a tapered section 41B connected to the straight section 41A and having a gradually changing groove cross sectional area.

These straight sections 41A and tapered sections 41B are structured in a square cross sectional shape as shown in FIGS. 6 and 7. The tapered sections 41B are formed in side end portions in the extension direction of the gas spring 40 in the cylinder grooves 41, and are formed in a tapered shape so that their cross sectional areas are gradually reduced in the extension direction of the gas spring 40. Each tapered section 41B has the same cross sectional area as the straight section 41A at a portion connecting to this straight section 41A. Further, it is preferable that a taper angle θ of each tapered section 41B to the axial core of the cylinder 21 be about one degree.

Although each tapered section 41B of the cylinder groove is tapered in a groove depth direction in the example of FIG. 7, it is also possible to have this tapered section 41B tapered in a groove width direction, or tapered both in a groove depth direction and in a groove width direction.

Accordingly, in this gas spring 40, in the extension process, when the piston 23 has reached the tapered section 41B from the straight section 41A of the cylinder groove 41 of the movable area X or Z and this tapered section 41B is moved in the extension direction, the extension-side damping force generated by the air 25 flowing from the rod-side chamber 28B to the piston-side chamber 28A through the tapered section 41B increases gradually, so that the moving speed of the piston 23 and the rod 22 in the extension direction will reduce gradually. Then, the piston 23 and the rod 22 stop slowly when the piston 23 reaches a position of the locking area Y or the collar 30 to which the piston 23 is brought into contact.

According to the gas spring 40 of the above-described embodiment, the following benefits (3) and (4) can be obtained in addition to the effects (1) and (2) of the gas spring 10 of the above-described embodiment.

(3) Since the side end portion of each cylinder groove 41 in the movable areas X and Z in the extension direction of the gas spring 40 is structured as the tapered section 41B which groove cross sectional area is reduced gradually in the extension direction, the extension-side damping force generated in the tapered section 41B increases gradually when the piston 23 has reached the tapered section 41B of the cylinder groove 41 in the extension process of the gas spring 40, so that speed of the piston 23 and the rod 22 in the extension direction can be reduced gradually. The piston 23 and the rod 22 stop when the piston has reached the longest extension end at which the piston is brought into contact with the locking area Y or the collar 30. As a result, in the extension process of the gas spring 40, the piston 23 and the rod 22 can be stopped slowly and not suddenly. Therefore, it is possible to prevent undesirable vibration of the rear door due to a abrupt stop of the rear door 4 is stopped during the opening process.

(4) Further, since each cylinder groove 41 of the cylinder 21 is structured by the straight section 41A and the tapered section 41B, both in a square cross sectional shape, the moving speed of the piston 23 and rod 22 can be reduced gradually when the piston 23 has reached the tapered section 41B in the extension process of the gas spring 40, as compared with the case where the straight section 41A and the tapered section 41B are in a triangular cross sectional shape, for example. In other words, while the groove cross sectional area changes suddenly in the tapered section 41B when the straight section 41A and the tapered section 41B of the cylinder groove 41 are in a triangular cross sectional shape, the groove cross sectional area in the tapered section 41B changes gradually when the straight section 41A and the tapered section 41B of the cylinder groove 41 are in a square cross sectional shape, as compared with the triangular cross sectional shape. Accordingly, when the piston 23 moves the tapered section 41B of the cylinder groove 41 in the extension process of the gas spring 40, the extension-side damping force generated by the flow of air 25 in the tapered section 41B can be increased gradually. Therefore, the moving speed of the piston 23 and the rod 22 in the extension direction in this case can be reduced gradually. As a result, it is possible to positively prevent the undesirable vibration of the rear door 4 which occurs at stopping of the rear door 4 while it is being opened.

In the gas springs 20 and 40 of the above-described embodiment, description has been made of the case where the cross sectional area is almost the same for the cylinders 29 and 41 between the movable areas X and Z of the cylinder 21. However, it is also advantageous to have the cross sectional areas of the cylinder grooves 29 and 41 different between the movable area X and the movable area Z. For example, the cross sectional areas of the cylinder grooves 29 and 41 in the movable area X are larger than the cross sectional areas of the cylinder grooves 29 and 41 in the movable area Z so that the opening speed of the rear door 4 is faster at the start of the opening or the opening speed at the rear door 4 is faster at just before the closing.

Further, in the above-described embodiments, description has been made of the case where the locking area Y has no cylinder grooves 29 and 41 is formed in the piston stroke area of the cylinder 21. However, it can also be arranged such that two or more locking areas Y are formed and the extent of opening of the rear door 4 is adjusted for three or more stages.

Further, in the above-described embodiments, description has been made of the case where the repulsive force of air 25 within the piston-side chamber 28A works on the piston 23 and the rod 22 in the extension process of the gas springs 20 and 40. It is also advantageous if a coil spring is disposed as a repulsive force means between the closed end portion of the cylinder 21 and the piston 23 and the biasing force of the coil spring is applied as repulsive force to the piston 23 and the rod 22.

Further, in the above-described embodiments, description has been made of the case where the gas cylinder 21 of the gas springs 20 and 40 is disposed in the vehicle body 2 and the rod 22 is disposed in the rear door 4. It is also advantageous if the cylinder 21 disposed in the rear door 4 and the rod 22 disposed in the vehicle body 2.

Although in the above-described embodiments, description has been made of the case where the gas springs 20 and 40 are used as lateral open-door type gas springs, the gas spring may also be used as an inverted type or an inverted push-up type gas spring pivotting on a horizontal axis.

As explained above, according to the gas spring relating to the present invention, it is possible to adjust the extent of opening of the opening and closing member at a plurality of stages without increasing the number of assembly process or incurring cost of production increase.

Although the invention has been illustrated and described with respect to several exemplary embodiments, it should be understood by those skilled in the art that the foregoing and various other changes, omissions and additions may be made to the present invention without departing from the spirit and scope thereof. Therefore, the present invention should not be understood as limited to the specific modes of implementation set out above but to include all possible embodiments which can be embodied within a scope encompassed and equivalents thereof with respect to the feature set out in the appended claims.

What is claimed is:

1. A gas spring comprising:
   a cylinder having an open and closed end;
   a piston slidably disposed within the cylinder and having a rod fixed to said piston and stretched from an open end of said cylinder;
   repulsive force means for generating a repulsive force for biasing said rod to an extension direction and disposed within said cylinder;
   cylinder grooves extending in an axial direction of said cylinder formed on an inner periphery of said cylinder so that an extension side damping force is generated in said cylinder grooves when said rod is slidably moved;
   one end of said cylinder and said rod being attached to a main body and the other end of said cylinder fitted to an opening and closing member pivotally provided in said main body, wherein
   said cylinder grooves are formed in a side area of said cylinder, excluding a predetermined area in a stroke direction of said piston, and
   each of said cylinder grooves having a square cross-sectional shape comprised of a straight section having a constant cross-sectional area and a tapered section connected to the straight section, the tapered section formed in a tapered shape so that its cross-sectional area is gradually reduced in the extension direction of the rod.

2. A gas spring according to claim 1, wherein said cylinder grooves are formed with differentiating cross sectional areas in said both-side areas of said predetermined area in said stroke direction of said piston.

3. A gas spring according to claim 1, wherein said main body is a body of a four-wheel drive and said opening and closing member is a rear door pivotable around a vertical axis of said body.

4. A gas spring according to claim 2, wherein said main body is a body of a four-wheel drive and said opening and closing member is a rear door pivotable around a vertical axis of said body.

5. A gas spring as claimed in claim 1, wherein said opening and closing member is a rear door pivotable around a horizontal axis.

6. The gas spring according to claim 1, wherein each of said tapered sections of the cylinder groove is tapered in a depth direction of said groove.

7. The gas spring according to claim 1, wherein each of said tapered sections of the cylinder groove is tapered in a width direction of said groove.

8. The gas spring according to claim 1, wherein a taper angle θ of each of said tapered sections to an axial core of the cylinder is about one degree.

9. A sealed gas spring containing a gas therein comprising:
   a cylinder having an open end and a closed end;
   a piston slidably disposed within said cylinder and having a rod fixed thereto, said rod extending toward said open end of said cylinder and having an extension and compression direction when axially moved within said cylinder, said extension direction corresponding to a sliding movement of said piston toward said open end and the compression direction corresponding to a sliding movement of said piston toward said closed end;
   a rod guide disposed at a distal end of said cylinder on said open end for guiding said piston rod therethrough;
   a gas seal disposed at said open end of said cylinder and stacked on top of said rod guide, said gas seal sealing said open end of said cylinder to prevent said gas within said cylinder from escaping;
   a collar disposed at said open end of said cylinder and stacked on top of said gas seal, said collar for stopping sliding movement of said rod in said extension direction;
   said cylinder provided with a pair of axially aligned grooves of equal extent, each groove having a respective pair of ends wherein one of said ends is facing said closed end and the other is facing said open end, each of said grooves extending in an axial direction of said cylinder, said grooves formed on an inner periphery of said cylinder and spaced such that predetermined area of said cylinder between said grooves forms a piston rod locking area and wherein each of said cylinder grooves forms a respective extension zone wherein when said piston is moved into either extension zone, said gas will by-pass said piston through a respective said groove, thereby generating an extension damping force, said extension damping force acting upon a closed end side of said piston when said piston moves in said extension direction and an extension damping force acting upon an open end side of said piston when said piston moves in said compression direction, said piston rod locking area representing a cylinder area where said piston ceases travel as a result of balanced damping forces on both sides of said piston, as said piston moves in both said extension and compression directions, each of said cylinder grooves comprising a respective straight section having a constant cross-sectional area and a respective tapered section connected to the straight section, wherein each of said grooves are structured in a square cross-sectional shape, and wherein each of the tapered sections are located on the open end of each respective groove and each having a tapering shape such that its cross-sectional area is gradually reduced only in the extension direction of the rod so as to gradually reduce a piston speed only in said extension direction before reaching said piston rod locking area and said piston collar.

\* \* \* \* \*